United States Patent [19]
Just

[11] 3,834,769
[45] Sept. 10, 1974

[54] BRAKING SYSTEM FOR VEHICLES
[75] Inventor: Jerome O. Just, Sturtevant, Wis.
[73] Assignee: J. I. Case Company, Racine, Wis.
[22] Filed: Sept. 17, 1973
[21] Appl. No.: 398,199

[52] U.S. Cl.................. 303/6 R, 60/581, 188/16, 188/345, 188/354
[51] Int. Cl............................................ B60t 13/10
[58] Field of Search............ 303/6 C, 6 R, 6 A, 2, 7, 303/13, 84 A, 84 R; 188/345, 16, 106 P, 354; 180/6.2; 60/581

[56] References Cited
UNITED STATES PATENTS
2,336,891  12/1943  Schnell .............................. 188/354
3,441,319  4/1969  Boueil et al............................ 303/13

Primary Examiner—Duane A. Reger
Assistant Examiner—D. C. Butler
Attorney, Agent, or Firm—Dressler, Goldsmith, Clement & Gordon, Ltd.

[57] ABSTRACT

A braking system for a heavy duty vehicle is disclosed herein. The braking system includes left and right rear brakes with individual hydraulic circuits for each brake and the circuits are arranged so that a first braking force for each of the brakes is produced when both circuits are pressurized and a second braking force that is substantially greater than the first braking force for each brake is developed when only one circuit is pressurized while the other circuit is connected to the reservoir. The braking system also incorporates left and right front brakes which are simultaneously actuated when both left and right rear brakes are actuated.

6 Claims, 5 Drawing Figures

BRAKING SYSTEM FOR VEHICLES

BACKGROUND OF THE INVENTION

Many heavy duty vehicles, such as tractors, utilize a braking system that consists of separate and independent brakes for each rear wheel that allow the operator to utilize the brakes to assist in turning of the vehicle under adverse conditions on a work site.

Because of the large size of these vehicles, it is desirable to have four wheel braking for high-speed road travel. This is usually accomplished by providing brakes for the left and right front wheels that may be operated in conjunction with the rear wheel brakes when the vehicle is traveling on a highway.

In four wheel braking systems of the above type, it is desirable to have approximately the same braking effort being applied to each of the wheels during highway travel. However, in negotiating a sharp turn on a work site, it is desirable to have additional braking effort being applied when the braking force is only being applied to one rear wheel. Heretofore, this has been accomplished by having the operator apply additional force to the associated brake pedal.

SUMMARY OF THE INVENTION

The present invention provides an efficient hydraulic brake system for a heavy duty vehicle, such as a tractor which has independent brakes for each rear wheel. The braking system is designed so that additional braking force is automatically applied to either the left or the right rear wheel when only one of the brakes is actuated while a second braking force, which is substantially less than the first braking force, is applied to each of the rear wheels when both the left and right hand brakes are simultaneously actuated. The system also incorporates an automatic arrangement wherein brakes cooperating with the front wheels are automatically actuated when both rear brakes are simultaneously actuated.

The braking system of the present invention incorporates left and right hand fluid circuits that are respectively interposed between a source of fluid and the left and right hand rear brakes. Each circuit incorporates means for producing a first braking force for each of the brakes when both circuits are pressurized and a second braking force substantially greater than the first braking force for each brake when only one fluid circuit is pressurized. The braking system also incorporates an auxiliary circuit that cooperates with the left and right hand circuits for automatically actuating both front brakes when both rear brakes are actuated.

In one embodiment of the invention, the additional braking force for either the left or right rear wheel is produced by actuating first and second fluid motors in one circuit when the other circuit is in an inoperative position and actuating only one of the fluid motors when both circuits are simultaneously pressurized. In another version, the additional braking force is produced by changing the mechanical advantage between the fluid motor that supplies the braking force and the actuating arm connected to the brake.

In a further embodiment, the additional braking force is produced by delivering the pressurized fluid to an intensifier when only one brake is actuated and by-passing the intensifier when both brakes are simultaneously actuated.

DETAILED DESCRIPTION

Figure 1:
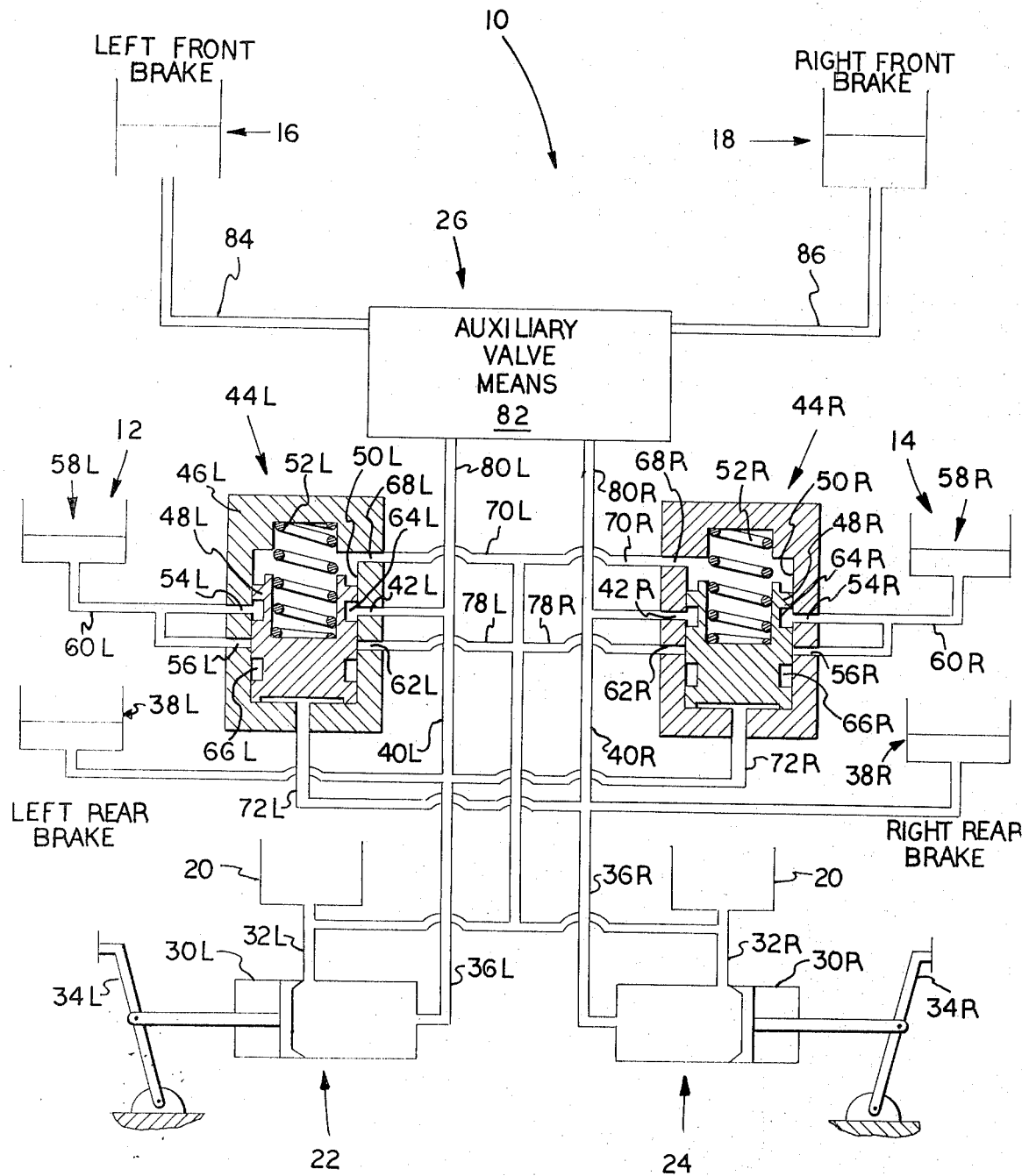
FIG. 1 shows a schematic hydraulic control circuit for a braking system of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the invention to the embodiments illustrated.

FIG. 1 of the drawing generally discloses a braking system 10 for heavy duty vehicles, such as large tractors. Braking system 10 consists of left rear brake 12, right rear brake 14, left front brake 16 and right front brake 18. Only the fluid motors forming parts of each of the brakes have been shown since the brake itself forms no part of the present invention. The actual brakes could take various forms, such as caliper type disc brakes, drum brakes, and the like.

The actuating system for the four brakes includes a source of fluid contained in a reservoir 20 with a first or left hydraulic circuit 22 between reservoir 20 and left rear brake 12 and a second hydraulic circuit 24 between reservoir 20 and right rear brake 14. The actuating system also incorporates an auxiliary hydraulic circuit 26 located between the first and second circuits 22 and 24 and the left and right front brakes 16 and 18. Since the circuits 22 and 24 are identical in construction, only one will be described in detail and the suffixes "L" and "R" utilized to indicate the left and right circuits.

First or left fluid circuit 22 includes a master cylinder 30L connected by conduit 32L to reservoir 20. Master cylinder 30L is actuated by a left hand actuator or foot pedal 34L to supply fluid under pressure from reservoir 20 to conduit 36L. Conduit 36L leads directly to a first fluid motor 38L that forms part of the left rear brake 12 and the motor may be of the one-way type that has its piston rod spring biased to a retracted position.

Hydraulic circuit 22 also includes a branch conduit 40L that leads from conduit 36L to a first port 42L of valve means 44L. Valve means 44L includes a housing 46L having a piston 48L reciprocated in a bore 50L and normally held in a first position by a spring 52L. Valve bore 50L has first and second outlet ports 54L and 56L that are connected to a second fluid motor 58L through conduit 60L. The second fluid motor 58L is again of the one-way type wherein the piston rod is biased to a retracted position and the fluid motor forms part of the left rear brake. Port 54L in valve bore 50L is axially aligned with port 42L while port 56L is axially aligned with a further port 62L that will be described later.

In addition, valve spool 48L has first and second circumferentially extending grooves 64L and 66L that are respectively adapted to interconnect ports 42L and 54L when the valve is in the position illustrated and interconnect ports 56L and 62L when the valve is moved from the position illustrated to a second position. In addition, valve bore 50L has a further port 68L that is connected to reservoir 20 through a conduit 70L.

The second or right hydraulic fluid circuit is identical in construction and like reference numerals have been applied to the same parts.

In addition, the first and second circuits 22 and 24 are interconnected in a manner that will now be described. Conduit 36L of the left hand or first circuit 22 is connected to the end of valve bore 50R in the right hand circuit through a branch circuit 72R while the conduit 36R in the right hand circuit or second circuit is connected to the end of bore 50L through a branch conduit 72L.

With the first and second circuits 22 and 24 arranged as described, actuation of left-hand foot pedal 34L while the right-hand foot pedal is in an inoperative position, will move master cylinder 30L from an inoperative to an operative position to supply fluid under pressure to conduit 36L. This fluid will be directed to the first fluid motor 38L to energize the motor in the left rear brake and at the same time fluid will be directed to the second fluid motor 58L through branch conduit 40L, valve 44L and conduit 60L.

The pressurized fluid in conduit 36L will also be received into conduit 72R to move valve spool 48R to the second position (not shown) and interconnect ports 56R and 62R. This will connect the second fluid motor 58R in the right rear brake to reservoir 20 through branch conduit 78R.

Assuming now that both brake pedals 34L and 34R are actuated simultneously, both hydraulic circuits 22 and 24 will be pressurized and both valve spools 48L and 48R will be moved to the second position (not shown) so that fluid motors 58L and 58R are both connected to reservoir 20. This means that only fluid motors 38L and 38R are actuated in the left and right brakes respectively. Assuming that the size of the motors 38 and 58 are the same, the actuating system would then produce a first braking force for each of the brakes when both hydraulic circuits are pressurized and a second braking force that is substantially greater or twice that of the first braking force when only one hydraulic circuit is pressurized while the other hydraulic circuit is in an inoperative position.

With the arrangement described above, if an operator desires to make a very sharp turn on a work site, it is only necessary for him to depress the foot lever that is associated with the direction of the turn. This will automatically produce a large braking force on that wheel and result in a sharp turn. If the operator desires to make a sudden stop, both brakes are depressed so that both circuits are energized and both valve spools 48L and 48R are moved to the second position and a reduced braking force is effected for each of the left and right rear brakes.

The braking system 10 also incorporates an auxiliary circuit 26 that is connected to the first and second circuits 22 and 24 so that both left and right front brakes 16 and 18 are automatically actuated when both rear brakes are actuated. The auxiliary circuits 26 include further branch conduits 80L and 80R that lead from branch conduits 40L and 40R to an auxiliary valve means 82. Auxiliary valve means 82 is connected to left front brake 16 through conduit 84 and right front brake 18 through conduit 86. Auxiliary valve means 82 may be of the type disclosed and claimed in a copending U.S. Pat. application Ser. No. 398,202 for a Vehicle Brake System filed Sept. 17, 1973 by John F. Wilson and assigned to the assignee of this application. The auxiliary valve means is of the type which supplies fluid under pressure to both conduits 84 and 86 when fluid under pressure is in both of the branch conduits 80L and 80R and prevents fluid under pressure from being received into conduits 84 and 86 when there is no fluid under pressure in one or both branch conduits 80L and 80R.

The hydraulic braking system so far described is particularly adapted for a caliper type brake wherein at least two sets of brake pads are associated with a brake disc. For example, the first set of pads for each rear wheel would be connected to the first cylinder 38 while the second set would be connected to fluid motor 58. Of course, if additional braking force were desired, additional braking pads could be associated with either of the fluid motors or additional fluid motors could be utilized.

Figure 2:
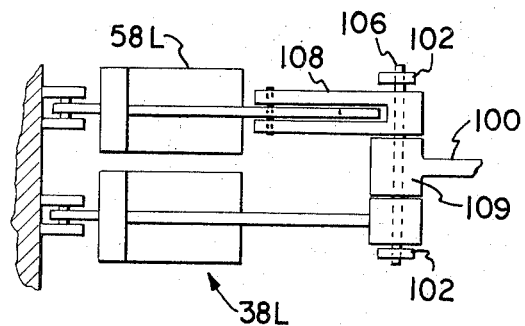
FIG. 2 is a fragmentary plan view illustrating the linkage connection between the fluid motors of each hydraulic circuit and the associated brakes.
Figure 3:
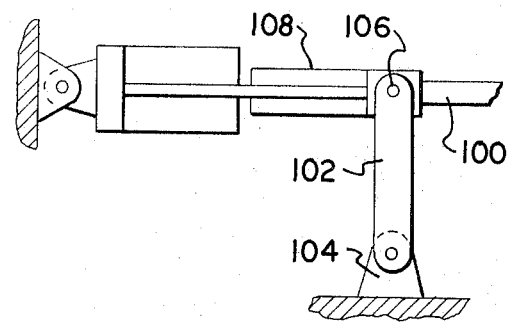
FIG. 3 is a side elevation of the linkage system shown in FIG. 2.

FIGS. 2 and 3 show a linkage system that can be used for a braking system which incorporates a single brake actuator. FIGS. 2 and 3 show a single actuating arm 100 that is connected to the brake, such as an expanding type drum brake or band brake. The linkage system includes a pair of levers 102 that are respectively pivoted on brackets 104 (only one being shown) and interconnected at their upper ends by a pin 106 that also extends through a hub 109 on the end of actuating arm 100. The first fluid motor such as left-hand fluid motor 38L has its piston rod connected directly to pin 106 while the piston rod of the second fluid motor 58L is connected through a lost motion connection 108 to pin 102.

Thus, when only the first motor 38L is actuated, the lost motion connection 108 allows relative movement between the piston rod of motor 58L and pin 102 while fluid motor 38L produces the braking force on actuating arm 100. If both motors are simultaneously energized, the actuating force from both motors is simultaneously applied to actuating arm 100.

Figure 4:
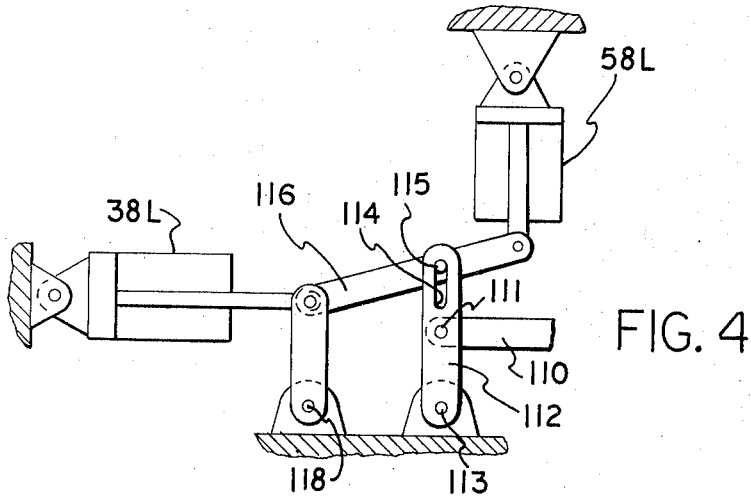
FIG. 4 is a side elevation of an alternate type of linkage system between the hydraulic circuits and the brakes.

FIG. 4 shows a further modified form of linkage system between the fluid motors and a single brake arm. In the embodiment shown in FIG. 4, actuating arm 110 is pivoted on a pivot pin 111 that is carried intermediate opposite ends of a lever 112. One end of lever 112 is pivotally supported on a fixed pin 113 while the opposite end has an elongated slot 114 that receives a pin 115 carried by a second lever 116. One end of the second lever 116 is connected to the piston rod of the first motor 38L and also to one end of a support lever 117 pivoted about a fixed pivot pin 118. The opposite end of second lever 116 is connected to the piston rod of motor 58L. With the second fluid motor 58L having its piston rod in the retracted position illustrated, actuation of motor 38L will produce an actuating force and pivot lever 112 about pivot pin 113. With the second fluid motor 58L in the position illustrated, the linkage has a first position that defines a mechanical advantage for any forces that are applied to the linkage system from fluid motor 38L.

If, however, the second fluid motor is energized, the pin 115 will move to the opposite end of elongated slot 114 and the linkage system will then be in a second position wherein a second mechanical advantage less than the first mechanical advantage is developed between the fluid motor 38L and the actuating arm 110.

With the arrangement illustrated in FIG. 4, the second fluid motor 58L would have to be of the normally extended one-way type motor that would be moved to the retracted position shown in FIG. 4 when fluid pressure is received into line 60L. Alternatively, the connections for conduit 40L and 78L could be reversed so that the second fluid motor 58L would only be energized when a reduced braking force is desired.

Figure 5:
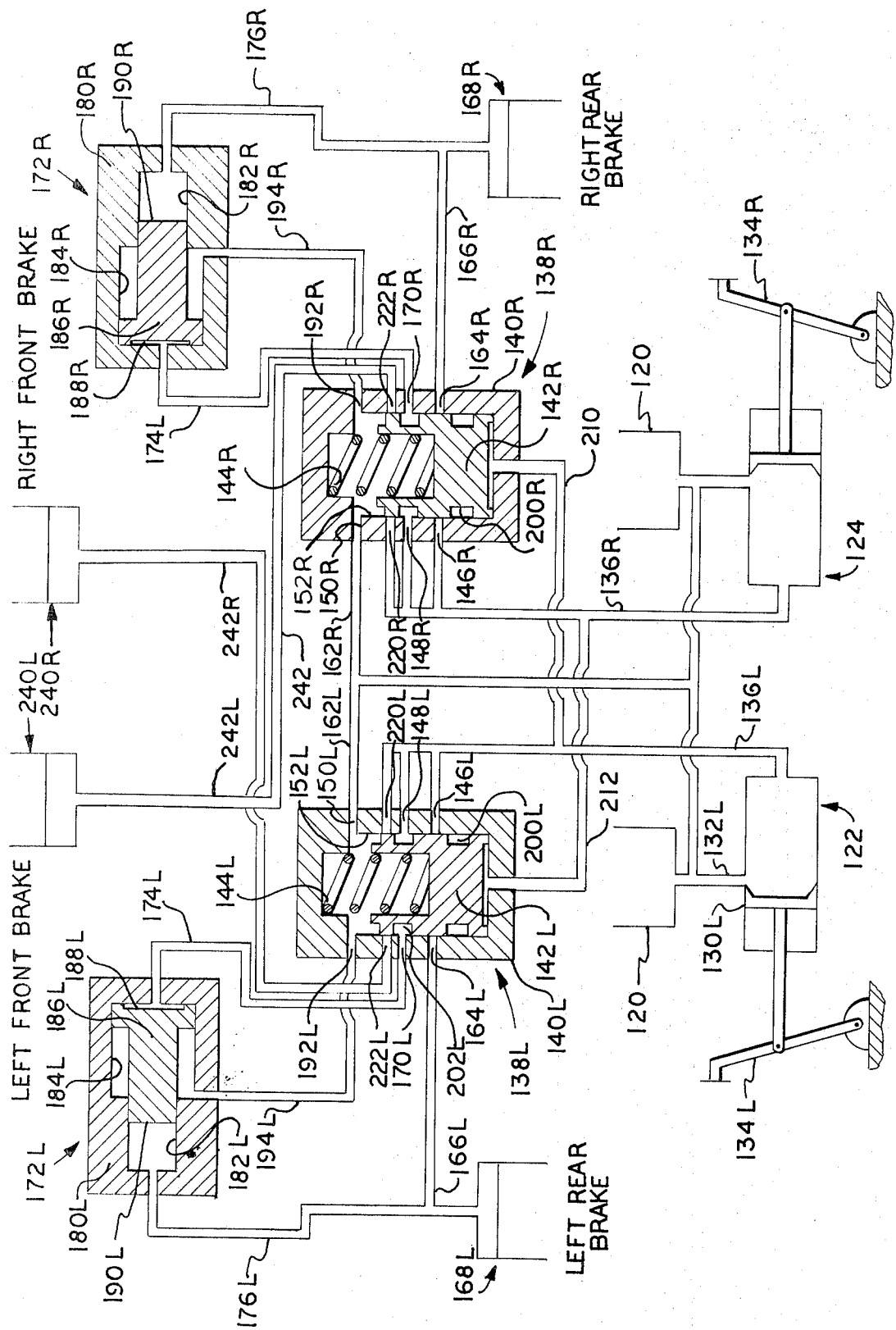
FIG. 5 is a modified form of hydraulic circuit.

A slightly further modified form of the invention is illustrated in FIG. 5 and the braking system shown in this version is particularly adapted for producing different braking forces under different conditions while utilizing a single fluid motor associated with each of the left and right rear brakes. The modified braking system shown in FIG. 5 again includes a left or first circuit 122 and a right or second circuit 124 as well as an auxiliary circuit for left and right front brakes. Again, the left and right circuits 122 and 124 are identical in construction and like reference numerals will be applied utilizing the suffix L for the left-hand circuit and the suffix R for the right-hand circuit. The left circuit will be utilized as a description for the circuit.

Left circuit 122 includes master cylinder 130L connected to reservoir 120 through conduit 132L. Master cylinder 130L is actuated by foot lever 134L and when operative supplies fluid under pressure to conduit 136L which leads to valve 138L. Valve 138L includes a housing 140L having a piston 142L reciprocated therein and normally biased to a first position by a spring 144L. Conduit 136L is connected to two axially spaced ports 146L, 148L in valve bore 152L. Valve bore 152L also has a port 150L connected to reservoir 120 through conduit 162L and a first outlet port 164L connected by conduit 166L to fluid motor 168L. Valve bore 152L also has a further outlet port 170L connected to fluid motor 168L through an intensifier 172L and conduits 174L and 176L. Pressure intensifier 172L includes a housing 180L that has a valve bore 182L having an enlarged portion 184L and a piston 186L reciprocated therein. The piston has a first surface 188L that is substantially greater than the second surface 190L located at the opposite end thereof. In addition, an intermediate portion of bore 184L is connected to port 192L in valve bore 152L through conduit 194L. Valve spool 142L also has axially spaced circumferentially extending grooves 200L and 202L.

The braking system shown in FIG. 5 further includes interconnecting means between the two circuits that will result in a first braking force for each of the left and right rear brakes when both circuits are energized and a second braking force that is substantially greater than the first braking force for each brake when only one circuit is energized. This interconnecting means consists of a branch conduit 210 leading from conduit 136L to the lower end of valve bore 152R and a further conduit 212 leading from conduit 136R to the lower end of valve bore 152L.

Considering now the application of the braking force to only one of the brakes, the left rear brake, actuation of the foot pedal 134L will energize the master cylinder 130L from an inoperative to an operative position to supply fluid under pressure to conduit 136L. With the piston 142L in the solid-line position shown in FIG. 5, this fluid will be directed through ports 148L and 170L to one end of valve bore 184L to energize fluid motor 168L. Because the total surface area of surface 188L is substantially greater than the surface 190L, the pressure applied to one end of valve spool 186L will be substantially increased, the amount being determined by the difference in surface areas between surfaces 188L and 190L. Assuming that both circuits are simultaneously energized, both valve spools 142L and 142R will be moved to the second position (not shown) interconnecting ports 146L and 164L through groove 200L and blocking ports 148L and 148R. This will mean that the pressure intensifier will be by-passed and the fluid under pressure in each of the circuits 122 and 124 will be supplied directly to the respective fluid motors 168L and 168R.

As indicated above, the braking system drawn in FIG. 5 also includes an auxiliary circuit for actuating both front brakes simultaneously when both rear brakes are actuated and preventing actuation of either front brake when only one rear brake is actuated. This auxiliary circuit may be in the form described in connection with the embodiment of FIG. 1 or may be modified in the manner now to be described.

Conduit 136L may be connected to a port 220L that is located in circumferential alignment with a further port 222L, which is connected to the right front fluid motor 240R through conduit 242R. Likewise, conduit 136R is connected to port 220R which is in circumferential alignment with port 222R which in turn is connected to the left front brake 240L through conduit 242L.

Summarizing the operation of the embodiment shown in FIG. 5, when the left brake pedal 134L is actuated while the right brake pedal 134R is in an inoperative position, fluid under pressure will be delivered to conduit 136L. This fluid will pass through port 148L, groove 202L, port 170L and be delivered to pressure intensifier 172L through conduit 174L. This will cause the pressure of the fluid to be intensified and actuate left rear brake 168 at a higher pressure. The same will occur when right brake pedal 134R is actuated while left brake pedal 134L is in an inoperative position.

If both brake pedals are simultaneously actuated, both valve spools 142L and 142R will be moved to the second position (not shown) wherein conduit 166L is connected to conduit 136L through groove 200L while conduit 136R is connected to conduit 166R through groove 200R. In this condition, both intensifier 172L and 172R are bypassed so that the left and right rear brakes are actuated at the lower pressure. At the same time, movement of the valve spools to the second positions will also connect conduits 136L and 136R to conduits 242L and 242R so that the left and right front brakes 240L and 240R are simultaneously actuated.

As can be seen from the above description, the present invention provides a simple and inexpensive hydraulic circuit wherein a higher braking pressure is automatically applied when only one brake is actuated and also automatically causes four brakes to be actuated when both the left and right rear brakes are actuated. All of this is accomplished without any manipulation of any levers or other attention required by the operator.

I claim:

1. In a braking system for a vehicle having left and right rear brakes, an actuating system including left and right master cylinders respectively cooperating with the left and right brakes, a fluid source connected to said master cylinders, left and right circuits connecting said left and right master cylinders to the respective brakes, left and right actuators for individually moving said master cylinders between inoperative and operative positions, and means in said circuits for (1) producing a first braking force for each of said brakes when both master cylinders are in an operative position and (2) producing a second braking force substantially greater than the first braking force for each brake when one master cylinder is operative while the other master cylinder is inoperative.

2. A braking system as defined in claim 1, in which said vehicle has left and right front brakes and further including an auxiliary circuit connected to said circuits for (1) actuating said front brakes when both said rear brakes are actuated simultaneously and (2) preventing actuation of said front brakes when only one rear brake is actuated.

3. A braking system as defined in claim 1, in which said means in said circuits includes a pressure intensifier connected to the associated brake in each circuit and means in each circuit for directing the fluid from the associated master cylinder to said intensifier when only one brake is actuated and bypassing said intensifier when both master cylinders are operative.

4. A braking system as defined in claim 1, in which said means in said circuits includes first and second fluid motors in each circuit and valve means in each circuit for selectively controlling the flow of fluid to one motor.

5. A braking system as defined in claim 4, in which said left and right brakes each have an actuating arm associated therewith and in which the first and second motors in each circuit are connected to an associated actuating arm.

6. A braking system as defined in claim 4, in which said left and right brakes each have an actuating arm and said means in said circuits includes a linkage system for each circuit between said actuating arm and said first and second fluid motors, and in which each linkage system has (1) a first position defining a first mechanical advantage for any forces applied to said linkage system when only one master cylinder is operative and (2) a second position defining a second mechanical advantage less than the first mechanical advantage when both master cylinders are operative.

* * * * *